US008494887B2

(12) United States Patent
Walser et al.

(10) Patent No.: US 8,494,887 B2
(45) Date of Patent: Jul. 23, 2013

(54) GENERATING AN OPTIMIZED PRICING PLAN

(75) Inventors: Joachim Paul Walser, Munich (DE); LaMott G. Oren, Dallas, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1689 days.

(21) Appl. No.: 10/315,282

(22) Filed: Dec. 9, 2002

(65) Prior Publication Data

US 2003/0110066 A1 Jun. 12, 2003

Related U.S. Application Data

(60) Provisional application No. 60/339,378, filed on Dec. 10, 2001.

(51) Int. Cl.
*G06Q 10/00* (2012.01)
(52) U.S. Cl.
USPC .......................................................... 705/7.11
(58) Field of Classification Search
USPC .......................................................... 705/7.11
See application file for complete search history.

(56) References Cited

U.S. PATENT DOCUMENTS

| | | | | |
|---|---|---|---|---|
| 5,615,109 A * | 3/1997 | Eder | | 705/8 |
| 5,873,069 A * | 2/1999 | Reuhl et al. | | 705/20 |
| 6,078,893 A | 6/2000 | Ouimet et al. | | 705/10 |
| 6,094,641 A | 7/2000 | Ouimet et al. | | 705/10 |
| 6,308,162 B1 | 10/2001 | Ouimet et al. | | 705/7 |
| 6,553,352 B2 * | 4/2003 | Delurgio et al. | | 705/400 |
| 6,735,596 B2 * | 5/2004 | Corynen | | 707/102 |
| 7,020,617 B2 * | 3/2006 | Ouimet | | 705/7 |
| 7,092,896 B2 * | 8/2006 | Delurgio et al. | | 705/7.35 |
| 7,092,918 B1 * | 8/2006 | Delurgio et al. | | 705/400 |
| 7,130,811 B1 * | 10/2006 | Delurgio et al. | | 705/14.43 |
| 7,233,914 B1 * | 6/2007 | Wijaya et al. | | 705/26 |
| 7,240,019 B2 * | 7/2007 | Delurgio et al. | | 705/7.31 |
| 7,249,031 B2 * | 7/2007 | Close et al. | | 705/20 |
| 7,249,032 B1 * | 7/2007 | Close et al. | | 705/20 |
| 7,249,033 B1 * | 7/2007 | Close et al. | | 705/7.35 |
| 7,302,410 B1 * | 11/2007 | Venkatraman et al. | | 705/35 |
| 7,617,119 B1 * | 11/2009 | Neal et al. | | 705/7.35 |

(Continued)

OTHER PUBLICATIONS

Ue-Pyng Wen & Shuh-Tzy Hsu, "Linear bi-level Programming Problems—A Review," 42 J. Operational Research Society 125 (1991).*

(Continued)

*Primary Examiner* — Justin M Pats
(74) *Attorney, Agent, or Firm* — Jackson White, PC; Steven J. Laureanti

(57) ABSTRACT

Generating an optimized pricing plan includes accessing a hierarchy comprising a sequence of levels, where each level includes an objective function and a set of constraints associated with the objective function. A mathematical programming model representing a pricing plan problem is determined for an item group comprising items. The following is repeated for each level of the sequence of levels: selecting a level comprising an objective function and a set of constraints associated with the objective function, determining an optimized boundary for the objective function, and adding a constraint generated from the optimized boundary to the set of constraints of a next level. An objective function of a last level of the sequence is optimized subject to the set of constraints associated with the objective function to yield an optimized result. An optimized pricing plan is generated in accordance with the optimized result.

33 Claims, 4 Drawing Sheets

U.S. PATENT DOCUMENTS

| | | | |
|---|---|---|---|
| 7,809,581 B1 * | 10/2010 | Neal et al. | 705/1.1 |
| 7,877,286 B1 * | 1/2011 | Neal et al. | 705/7.31 |
| 7,937,282 B2 * | 5/2011 | Walser et al. | 705/7.35 |
| 2002/0032610 A1 * | 3/2002 | Gold et al. | 705/20 |
| 2002/0082881 A1 * | 6/2002 | Price et al. | 705/7 |
| 2002/0107818 A1 * | 8/2002 | McEwen et al. | 705/400 |
| 2002/0165760 A1 * | 11/2002 | Delurgio et al. | 705/10 |
| 2002/0165834 A1 * | 11/2002 | Delurgio et al. | 705/400 |
| 2003/0023567 A1 * | 1/2003 | Berkovitz et al. | 705/400 |
| 2003/0110072 A1 * | 6/2003 | Delurgio et al. | 705/10 |
| 2003/0191725 A1 * | 10/2003 | Ratliff et al. | 705/400 |
| 2006/0161504 A1 * | 7/2006 | Walser et al. | 705/400 |
| 2007/0226064 A1 * | 9/2007 | Yu et al. | 705/10 |
| 2008/0040202 A1 * | 2/2008 | Walser et al. | 705/10 |
| 2008/0208678 A1 * | 8/2008 | Walser et al. | 705/10 |

OTHER PUBLICATIONS

Stephen J. Hoch et al., "Determinants of Store-Level Price Elasticity," 32 J. Marketing Research 17 (1995).*

G. Anandalingam & T.L. Friesz, "Hierarchical Optimization: An Introduction," 34 Annals of Operations Research 1 (1992).*

Ho, Computing True Shadow Prices in Linear Programming, Informatica, col. 11, No. 4, p. 421-34.*

McCarl, Applied Integer Programming, 1997, p. 1-35.*

Pending Patent Application, U.S. Appl. No. 10/279,182, entitled "Calculating Price Elasticity," by Boyko Ivanov, et al. Oct. 23, 2002.

* cited by examiner

GENERATING AN OPTIMIZED PRICING PLAN

RELATED APPLICATIONS

This application claims benefit under 35 U.S.C. §119(e) of U.S. Provisional Application Ser. No. 60/339,378, filed Dec. 10, 2001, entitled "Optimizing Prices of an Item Collection, Subject to Hierarchical Objectives and Business Constraints."

TECHNICAL FIELD OF THE INVENTION

This invention relates generally to the field of supply chain planning and more specifically to generating an optimized pricing plan.

BACKGROUND OF THE INVENTION

A business generates a pricing plan to determine the prices of items offered by the business such as products, goods, or services. Pricing decisions may be important since these decisions may have an impact on customer demand, profitability, and business operations. Determining prices may be complex if a collection of interdependent items needs to be priced across different channels, for example, different stores having different competitors. The pricing plan may be required to reflect the competitive situation, while at the same time satisfying business objectives such as profitability as well as targets for revenues, market share, or company price image. In addition, there may be business constraints that need to be met. Consequently, determining an optimized pricing plan has posed challenges for businesses.

SUMMARY OF THE INVENTION

In accordance with the present invention, disadvantages and problems associated with previous techniques for determining pricing plans may be reduced or eliminated.

According to one embodiment of the present invention, generating an optimized pricing plan includes accessing a hierarchy comprising a sequence of levels, where each level includes an objective function and a set of constraints associated with the objective function. A mathematical programming model representing a pricing plan problem is determined for an item group comprising items, the mathematical programming model comprising a set of initial constraints. The following is repeated for each level of the sequence of levels: selecting a level comprising an objective function and a set of constraints associated with the objective function, adding the set of constraints associated with the objective function to the set of initial constraints, optimizing the mathematical programming model to yield an optimized boundary for the objective function, and adding a constraint generated from the optimized boundary to the set of constraints of a next level. An objective function of a last level of the sequence is optimized subject to the set of constraints associated with the objective function to yield an optimized result. The set of constraints includes a constraint generated from the optimized boundary of a previous level. An optimized pricing plan is generated in accordance with the optimized result. The optimized pricing plan associates a price with each item of the item group.

Certain embodiments of the invention may provide one or more technical advantages. A technical advantage of one embodiment may be that a pricing plan problem may be optimized according to a hierarchy of objectives, for example, maximizing profits while maintaining consistent pricing and a given sales volume. Optimizing a pricing plan problem according to a hierarchy of objectives may provide a pricing plan that better fits a company's objectives. Another technical advantage of one embodiment may be that pre-processing may be performed to set up a pricing plan problem. Pre-processing may include, for example, identifying and eliminating inconsistent constraints, dividing a category of items into more manageable item groups, and determining goals for individual time intervals, item groups, or locations. Another technical advantage of one embodiment may be that post-processing may be performed to conform optimized results to business constraints that might not have been taken into account during optimization. Post-processing may include, for example, rounding prices in accordance with rounding rules. Since price changes are known at this point, post-processing may include evaluating the cost of changing prices and adjusting prices according to the cost evaluation and prioritizing price changes according to priority rules.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1:
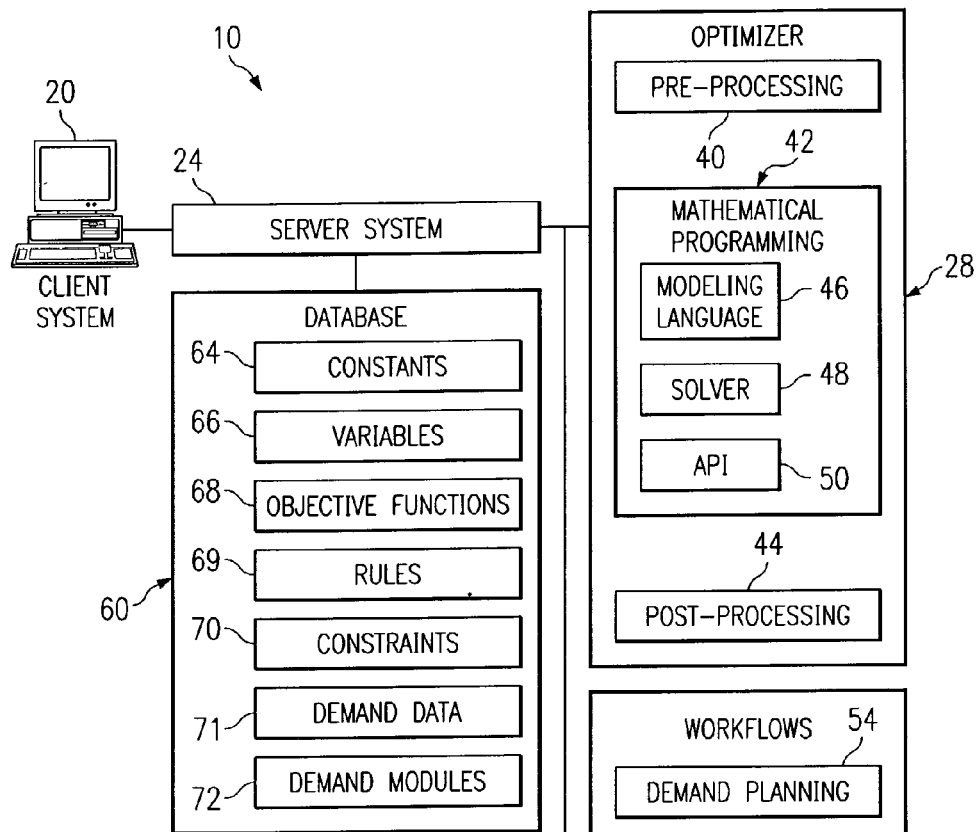
FIG. 1 illustrates an example system that generates an optimized pricing plan for a category of items.

FIG. 1 illustrates an example system 10 that generates an optimized pricing plan for a category of items. A category may include one or more groups of items offered by a business such as parts, products, or services. Items may be related to each other by, for example, a cross price demand sensitivity or other constraint. A pricing plan lists prices for the items of a category at successive time intervals across a time period. A pricing plan may be subject to a hierarchy of objectives, for example, maximizing profits while maintaining consistent pricing and a given sales volume. A business may use system 10 to determine an optimized pricing plan for items offered by the business.

In one embodiment, client system 20 allows a user to communicate with a server system 24 to generate an optimized pricing plan. Client system 20 and server system 24 may each operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device. "Each" as used in this document refers to each member of a set or each member of a subset of a set.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANs), metropolitan area networks (MANs), wide area networks (WANs), a global computer network such as the Internet, or any other appropriate wire line, wireless, or other links.

Server system 24 manages applications that generate an optimized pricing plan, such as an optimizer 28, workflows 32, and a demand analytics module 36. Optimizer 28 generates a mathematical programming model that represents a pricing plan problem, and optimizes the mathematical programming model in order to determine an optimized pricing plan. Optimizer 28 may include a pre-processing module 40, a mathematical programming module 42, and a post-processing module 44. Pre-processing module 40 performs pre-processing to set up the pricing plan problem. For example, pre-processing module 40 may identify and eliminate inconsistent constraints, divide a category into more manageable item groups, and determine goals for individual time intervals, item groups, or locations. Pre-processing module 40, however, may perform any function suitable for setting up the pricing plan problem.

Mathematical programming module 42 generates a mathematical programming model having objectives and constraints formulated by mathematical equations and inequalities. According to one example, the mathematical programming model may include a non-linear relation, and may be solved using non-linear programming (NLP) techniques such as, for example, a reduced-gradient technique or a projected augmented Lagrangian technique. The mathematical programming model may include item costs, item demand forecasts, item allowed price ranges, a price-demand sensitivity model, a cross-price demand sensitivity model, price link constraints, price band constraints, a base price, competitor prices for a set of image items, an item inventory, a price image model, as well as constraints that model profit, revenues, image index, and other features. Mathematical programming module 42 may include a modeling language 46, a solver 48, and an application program interface (API) 50. Modeling language 46 may include, for example, A Mathematical Programming Language (AMPL) developed at Bell Laboratories, General Algebraic Modeling System (GAMS) by GAMS DEVELOPMENT CORPORATION, Advanced Interactive Mathematical Modeling Software (AIMMS) by PARAGON DECISION TECHNOLOGY B.V., or any other language suitable for modeling a pricing plan problem. Solver 48 optimizes the mathematical programming model to yield optimized results. Solver 48 may include, for example, a nonlinear programming solver such as MINOS by STANFORD BUSINESS SOFTWARE, INC., CONOPT by ARKI CONSULTING AND DEVELOPMENT A/S, or any other mathematical programming solver operable to optimize a pricing plan problem. Application program interface 50 may provide a link between optimizer 28 and server system 24.

Post-processing module 44 performs post-processing to conform optimized results generated by solver 48 to business constraints that might not have been taken into account during optimization. For example, post-processing module 44 may round prices in accordance with rounding rules, evaluate the cost of changing prices and adjust prices according to the cost evaluation, and prioritize price changes according to priority rules. Post-processing modules 44, however, may perform any function suitable for conforming the optimized result to business constraints.

Workflows 32 supply information for formulating the pricing plan problem. Workflows 32 may include, for example, demand planning workflows 54, replenishment planning workflows 56, and merchandise planning workflows 58. Demand planning workflows 54 may be used to forecast a demand by, for example, determining a demand change in response to a price change. Replenishment planning workflows 56 may be used to ensure that inventories have an adequate supply of items in order to satisfy an optimized pricing plan. Merchandise planning workflows 58 may describe pricing goals for the items. For example, a pricing goal may require low prices for dairy items and higher prices for cleaning items.

Demand analytics module 36 calculates price elasticity, which describes how a price change affects a demand. The price elasticity of a demand may be defined as the ratio of a percentage increase in demand over a percentage decrease in price. According to this definition, price elasticity is usually non-negative due to the inverse relationship between demand and price. Cross price elasticity measures how a price change of one item affects a demand of another item. Cross price elasticity of a demand may be defined as a percentage increase in demand of an item resulting from a percentage increase in price of another item.

Cross price elasticity may be positive, negative, or zero. A positive cross price elasticity implies that the demand of an item increases if the price of another item decreases (due to, for example, cross-selling items together), whereas a negative cross price elasticity implies that the demand of an item decreases if the price of another item decreases (due to, for example, a substitution effect). A zero cross price elasticity implies that the demand of an item is not affected by the price of another item. Demand models may be used to calculate price elasticity.

Demand analytics module 36 evaluates and selects appropriate demand models and calculates price elasticity using the selected demand models. According to one embodiment, demand analytics module 36 accesses a number of demand models and demand data describing an item group. The demand models are evaluated in accordance with the demand data, and a demand model is selected in response to the evaluation. Demand analytic information such as a demand forecast and price elasticity may be calculated using the selected demand model.

A database 60 stores data that may be used by server system 24. Database 60 may be local to or remote from server system 24, and may be coupled to server system 24 using one or more local area networks (LANs), metropolitan area networks (MANs), wide area networks (WANs), a global computer network such as the Internet, or any other appropriate wire line, wireless, or other links. Database 60 may include, for example, constants 64, variables 66, objectives 68, rules 69, constraints 70, demand data 71, and demand models 72. Constants 64 and variables 66 are used to formulate a set of initial constraints for a mathematical programming model representing a pricing plan problem. Constants 64 may include, for example, the following:

| | |
|---|---|
| G | Group of items to be optimized together, for example, a group of items that are directly or indirectly related by constraints or by a cross-price demand sensitivity; |
| I | Sub-group of certain items used to track a competitor's prices, referred to as "image items"; |
| $l_{ij}$ | Price link constraint between items i and j constraining their prices using an equality relation that may additionally include an additive term $l^a_{ij}$; |
| $b_{ij}$ | Price band constraint between items i and j constraining the range of one item with respect to the other item using a relation that may additionally include an additive term $b^a_{ij}$; |
| $e_{ij}$ | Elasticity and cross-elasticity lift model for the sensitivity of demand of item j based on price of item i and base price of item i; $e_{ij}$ being a function that computes both the own-price and cross-price demand lifts; |
| $q_i$ | Base price of item i, on which the demand forecast for item i is based; |
| $c_i$ | Cost of item i; |
| $\underline{p_i}, \overline{p_i}$ | Lower bound and upper bound for price of item i; |
| $o_i$ | Competitor's price of item i; |
| $f_i$ | Demand forecast for an optimization period based on base price $q_i$ of item i; and |
| $u_i$ | Available inventory of item i. |

Variables 66 may include, for example, the following:

| | |
|---|---|
| $p_i$ | Price of item i; |
| $d_j = \prod_{i \in G} e_{ij}(p_i, q_i) \cdot f_i$ | Forecasted demand for item i in an optimization period, given price $p_i$; |
| $m_j = d_j \cdot (p_i - c_i)$ | Forecasted profit from selling item j according to forecasted demand; |
| $I_j = \sum_{i \in I} \frac{p_i}{o_i |I|}$ | Price image index over the image items used to track certain competitor's prices; |
| $M = \sum_{i \in G} m_i$ | Total profit from selling all items; |
| $R = \sum_{i \in G} (p_i \cdot d_i)$ | Total revenues from selling all items; and |
| $P = M/(R + \epsilon)$ | Total profit percentage for which a small fractional term $\epsilon$ is used to avoid division-by-zero on zero-revenues. |

Objective functions 68 represent objectives to be optimized to generate an optimized pricing plan. Objectives may be defined by, for example, acceptable performance targets measured by profits, revenues, unit sales, competitive image, or other suitable measure of performance. Other objectives, however, may be used.

Constraints 70 restrict the optimization of objective functions 68. Constraints 70 may, for example, restrict prices in response to a cost to produce an item, a manufacturer's suggested retail price, a competitor's price, or a maximum price change restriction. Constraints 70 may link related items such as different quantities of the same item or different brands of the same item. Such constraints 70 may include, for example, price-link constraints or price band constraints such as item-price inequalities. Constraints 70 may restrict prices with respect to a demand, for example, demand-price relations or cross-price elasticities. Constraints 70 governing price changes such as a minimum time between subsequent price changes of an item, a maximum number of simultaneous price changes of all items within one optimization period, or a price-implementation cost constraint may be included.

Rules 69 for controlling inventory may be used to avoid stock-outs or to accommodate lead-times. Rules 69 may be directional, such that the price of a first item may affect the price of a second item, but the price of the second item does not affect the price of the first item. Rules 69 may be received from any suitable source, such as from a user of client system 20 or from price and demand analytics module 36. The following is an example of an objective function 68 and constraints 70, where profit is maximized subject to constraints.

max M subject to $\underline{p_i} \leq p_i \leq \overline{p_i}$ price limits $p_i = l_{ij} \cdot p_j + l^a_{ij}$ price link constraints $p_i \leq b_{ij} \cdot p_j + b^a_{ij}$ price band constraints Any suitable objective function 68 or constraints 70, however, may be used.

Demand data 71 includes data that may be used to determine a price elasticity. Demand data 71 may include, for example, sales history, price history, competitor's prices, inventory availability, and other information that may be used to determine the relationship between price and demand. Demand models 72 may be applied to demand data 71 to determine price elasticity. Demand models 72 may include, for example, constant elasticity static models and models with coefficients varying according to functions such as polynomial or log functions.

Figure 2:
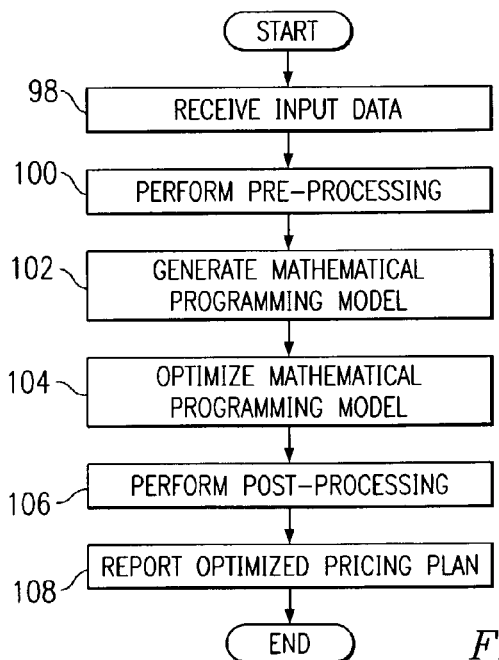
FIG. 2 is a flowchart illustrating an example method for generating an optimized pricing plan.

FIG. 2 is a flowchart illustrating an example method for generating an optimized pricing plan. One such pricing plan applies to a particular sales channel, such as one store, a set of stores, or any other point of sales. A set of stores to be optimized together may be chosen, for example, according to the geographic proximity of the stores or according to the proximity of the stores to a specific competitor's store. Each channel may be optimized separately to generate one optimized pricing plan, and the method may iterate over all channels to compute an optimal price of every item in every channel.

The method begins at step 98, where optimizer 28 receives input data. Input data may include a demand forecast, competitor prices, price demand sensitivity, cross-price sensitivity, and other price-related information. At step 100, pre-processing module 40 performs pre-processing in order to set up a pricing plan problem. Pre-processing is described in more detail with reference to FIG. 3. Mathematical programming module 42 generates a mathematical programming model of the pricing plan problem at step 102. The mathematical programming model may be expressed in modeling language 46.

Solver 48 optimizes the mathematical programming model at step 104 to generate optimized results. Optimization of the mathematical programming model is described in more detail with reference to FIG. 4. Post-processing module 44 performs post-processing at step 106. Post-processing may be performed to conform the optimized results to predetermined business constraints. Post-processing is described in more detail with reference to FIG. 5. An optimized pricing plan is reported at step 108, and the method ends.

The optimization method may be performed multiple times from different starting points in order to generate multiple locally optimal pricing plans. The pricing plans may be evaluated to determine a globally optimal pricing plan.

Figure 3:
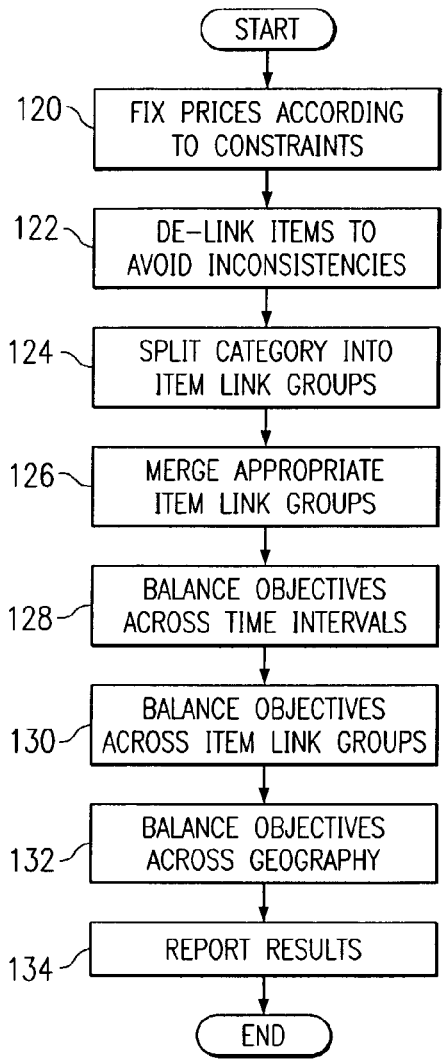
FIG. 3 is a flowchart illustrating an example method for performing pre-processing to set up a pricing plan problem for a mathematical programming model.

FIG. 3 is a flowchart illustrating an example method for performing pre-processing to set up a pricing plan problem for a category of items. The method begins at step 120, where pre-processing module 40 fixes the prices of a category of items according to one or more constraints. The prices of certain items may be fixed to satisfy a constraint. For example, a price may be fixed for a time interval if changing the price violates a maximum number of allowed price changes during the time interval. Items are de-linked to avoid inconsistencies at step 122. For example, if the price of an item A is linked to be equal to the price of an item B, but the price of item A and the price of item B are fixed at different prices, then the prices of items A and B are de-linked.

The category of items is split into item link groups at step 124. A category may include many unrelated items for which it may be inefficient to optimize together. Accordingly, a category may be split into item link groups that are optimized separately. An item link group may include items that are related by one or more constraints or cross price sensitivity. Appropriate item link groups may be merged at step 126. Some of the item link groups formed at step 124 may be too small to provide optimization with sufficient flexibility. Smaller item link groups may be merged to form a larger item link group that may be efficiently optimized with sufficient flexibility.

Goals such as merchandise planning goals for profits, revenues, or level of competitiveness are balanced across the time intervals of the optimization period at step 128. For example, a company may select to achieve a higher percentage of sales during peak time intervals and a lower percentage of sales during non-peak time intervals. Goals are balanced across item link groups at step 130. For example, a company may select to increase sales for more popular item link groups but not for other item link groups. Goals are balanced across geography at step 132. For example, a company may select to increase sales at stores in certain locations but not in other locations. Results are reported at step 134, and the method ends.

Figure 4:
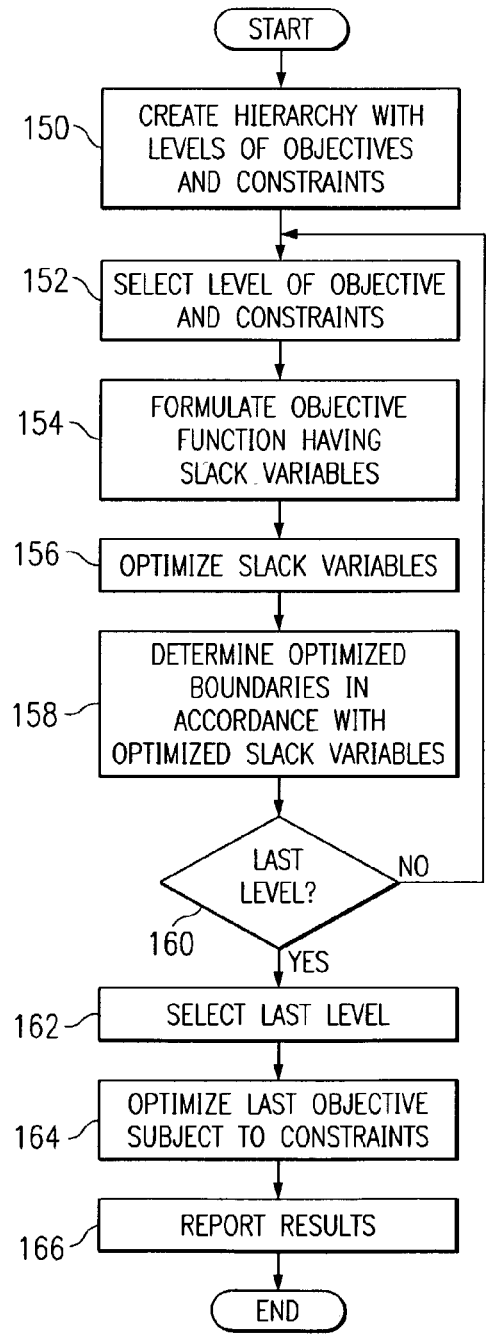
FIG. 4 is a flowchart illustrating an example method for optimizing a mathematical programming model subject to a hierarchy of objectives and constraints.

FIG. 4 is a flowchart illustrating an example method for optimizing a mathematical programming model subject to a hierarchy of objectives and constraints. The method begins at step 150, where a hierarchy comprising levels of objectives and constraints is created. A hierarchy may include, for example, a primary objective of maximizing revenue, a secondary objective of maximizing sales, and a tertiary objective of maintaining consistent pricing of image items around a competitor's prices. Other objectives or constraints may be used, for example, constraining deviations from previous prices.

Optimizer 28 selects a level comprising an objective and one or more associated constraints at step 152. An objective function having slack variables is formulated at step 154 to represent the selected objective and constraints. For example, an objective of meeting a revenue goal range may be formulated as follows. Goal LB and Goal UB represent lower and upper bounds, respectively, of the revenue goal range. RevenueMin and RevenueMax represent constraints restricting minimum and maximum revenue, respectively. MinSlack and MaxSlack represent slack variables for RevenueMin and RevenueMax, respectively. Revenue Slack represents slack variables to be optimized.

MinSlack>=0;
MaxSlack>=0;
subject to RevenueMin:
    Revenue+MinSlack>=GoalLB;
subject to RevenueMax:
    Revenue<=GoalUB+MaxSlack;
minimize RevenueSlack:
    RevenueTargetPenalty*(MinSlack+MaxSlack);

The slack variables are optimized at step 156. For example, the slack variables MinSlack and MaxSlack as expressed by RevenueSlack are minimized. If there are different objectives within one hierarchy level, penalties may be used in order to balance different objectives within the hierarchy level. Optimized boundaries are determined in accordance with the optimized slack variables at step 158. The optimized boundaries may be fixed at the values resulting from the optimization of the slack variables in order to ensure that the objectives of one hierarchy level are not violated beyond this level during subsequent hierarchy levels of the optimization.

If a last level of the hierarchy has not been reached at step 160, optimizer 28 returns to step 152 to select the next level of an objective and one or more constraints. If a last level has been reached at step 160, optimizer 28 proceeds to step 162 to select the last level. The objective of the last level is optimized subject to the associated constraints at step 164 followed by steps 192, 194, 196 of post-processing. Results are reported at step 166, and the method ends.

According to one embodiment, using a hierarchy of objectives may offer an advantage over combining objectives according to a weighting scheme. An advantage of one embodiment may be that a weighting scheme requires setting the weights or penalties in the overall objective function to spread the numerical range of the objectives in order to optimize the objectives. Defining such a weighting scheme may pose difficulties, however, since the range of each sub-objective may not be known before the optimization is complete. Furthermore, introducing widely varying weights to spread apart the different objectives may lead to numerical instabilities and problematic numerical scaling.

Figure 5:
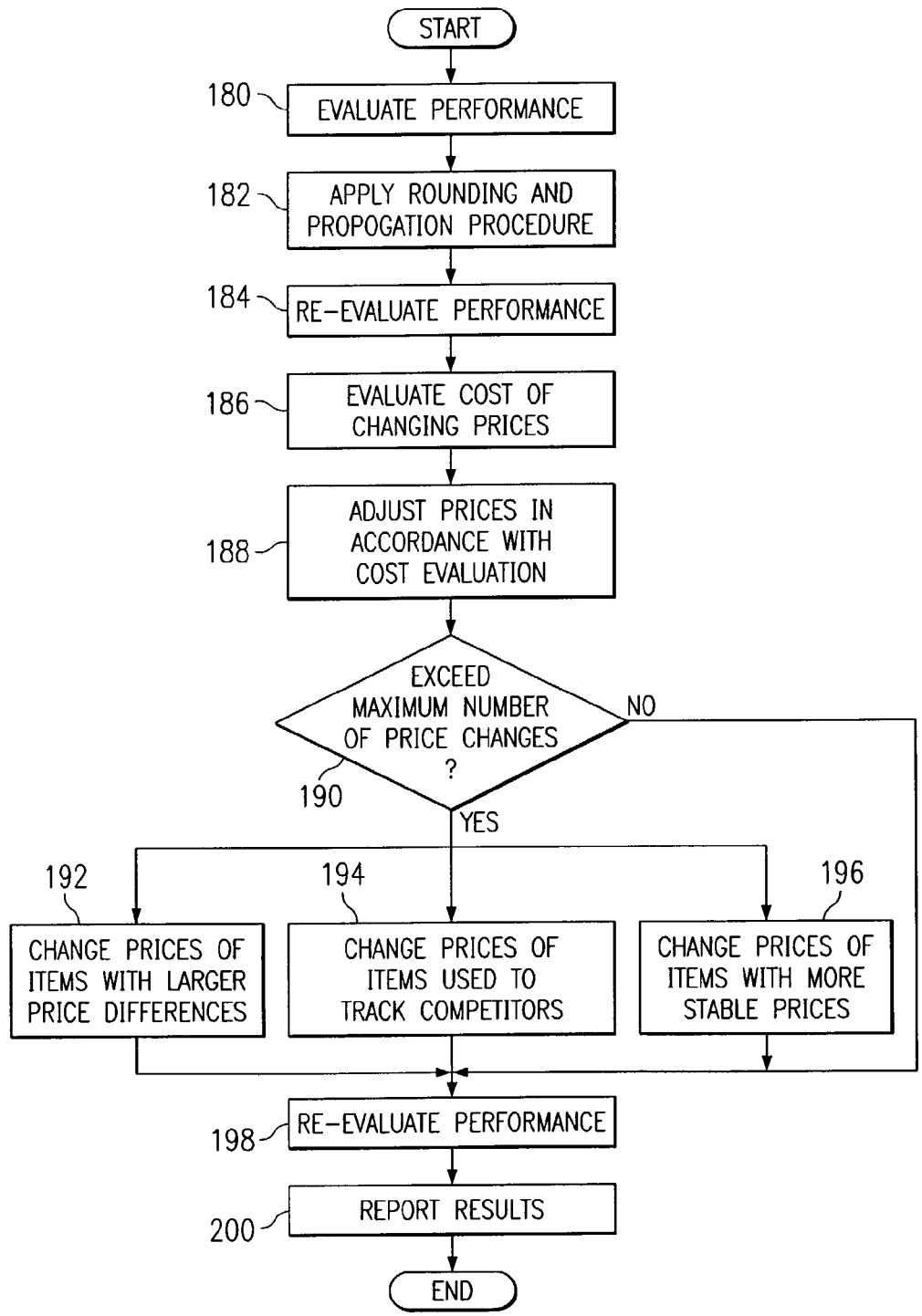
FIG. 5 is a flowchart illustrating an example method for performing post-processing of the results from optimizing a mathematical programming model.

FIG. 5 is a flowchart illustrating an example method for performing post-processing of the results from optimizing a mathematical programming model. Post-processing is performed in order to conform the optimized results to business constraints. The method begins at step 180, where post-processing module 44 evaluates the performance of the optimized results.

A rounding and propagation procedure is applied at step 182. A rounding and propagation procedure may be performed by, for example, using a graph representing the relationship between prices of items. An example of such graph is described with reference to FIG. 6.

Figure 6:
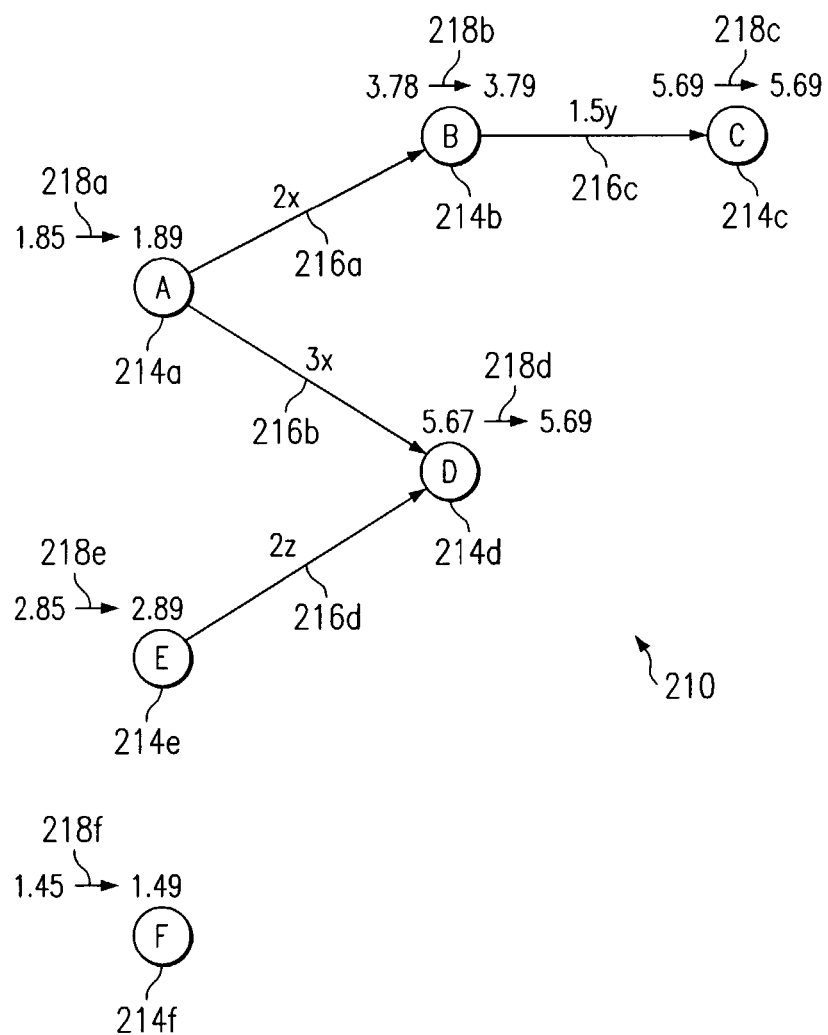
FIG. 6 illustrates an example graph representing the relationship between prices of items.

FIG. 6 illustrates an example graph 210 representing the relationship between prices of items. Circles 214 represent the prices for items A through F. Propagation arrows 216 represent rules for propagating the price of one item to determine the price of another item. For example, the price of item A is propagated to determine the price of item B by multiplying the price of item A by two. Rounding arrows 218 represent rounding rules. In the illustrated example, a rounding rule states that a price must be rounded up to the next price that ends with a nine, for example, $1.85 is rounded to $1.89.

According to an example rounding and propagation procedure, the price of item A is rounded. After the price of item A is rounded, the price is propagated to determine the price of item B. The price of item B is rounded, and then propagated to determine the price of item C, and so on. Once a price is determined, it is fixed to ensure consistent pricing. For example, once the price of item D is determined to be $5.69, it is not changed in accordance with a propagation from item E. Prices that are not linked with other prices are rounded independently of the rounding and propagation of the prices. For example, the price of item F is rounded independently of the rounding and propagation of other prices.

Returning to FIG. 5, the performance of the rounded and propagated prices is reevaluated at step 184. The reevaluation may be used to determine a change such as a decrease in performance resulting from applying the rounding and propagation procedure. Only after applying the rules 69 is it known which prices the overall method recommends to change. The cost of changing the prices is evaluated at step 186. The cost may measure, for example, an operational cost of implementing price changes. Prices are adjusted in accordance with the cost evaluation at step 188. For example, small price changes may be set back to an original price in order to avoid perturbance through small changes and an operational cost resulting from implementing the price changes. Post-processing module 44 enforces that the price changes meet a minimum required relative or absolute price change as compared to the original item price. Post-processing module 44 can either reset prices to the current prices or enforce the minimum required price change. Also, the improvement of performance resulting from a price change (for example, margin improvement over the original price) may be calculated in order to determine whether the price change justifies the cost incurred for implementing the price change. Post-processing module 44 determines whether the number of price changes exceed a predetermined maximum number of price changes at step 190. If the number of price changes exceeds a maximum number of price changes, post-processing module 44 may proceed to steps 192, 194, or 196 in order to determine which prices to change. Steps 192, 194, and 196 may be used to determine which prices are to be changed, or may be used to prioritize prices such that higher priority prices are changed during one time interval, and lower priority prices are changed during a next time interval. Steps 192, 194, and 196 may be performed in any suitable order. Any other suitable procedure for prioritizing price changes may be used at steps 192, 194, and 196.

For example, at step 192, the prices of items with the larger price changes receive the highest priority and are changed. Larger price changes may have a greater impact and are less likely to change again in comparison with smaller price changes. At step 194, prices of image items used to track competitors are changed because image items may be regarded as more important. At step 196, the prices of items with the more stable prices are changed. Items with the more stable prices may include for example, items that have not had a price change during a long time period or those items that have had the fewest price changes in a given time period. Changing the more stable prices may reduce the frequency of price changes, which may provide for more consistent pricing.

If the number of price changes does not exceed a maximum number of price changes at step 190, the method proceeds directly to step 198. Performance under the revised pricing plan is re-evaluated at step 198. The performance may be re-evaluated in order to allow for comparison with the optimization results. The results are reported at step 200, and the method ends.

Certain embodiments of the invention may provide one or more technical advantages. A technical advantage of one embodiment may be that a pricing plan problem may be optimized according to a hierarchy of objectives, for example, maximizing profits while maintaining consistent pricing and a given sales volume. Optimizing a pricing plan problem according to a hierarchy of objectives may provide a pricing plan that better fits a company's objectives. Another technical advantage of one embodiment may be that pre-processing may be performed to set up a pricing plan problem. Pre-processing may include, for example, identifying and eliminating inconsistent constraints, dividing a category of items into more manageable item groups, and determining goals for individual time intervals, item groups, or locations. Another technical advantage of one embodiment may be that post-processing may be performed to conform optimized results to business constraints that might not have been taken into account during optimization. Post-processing may include, for example, rounding prices in accordance with rounding rules, evaluating the cost of changing prices and adjusting prices according to the cost evaluation, and prioritizing price changes according to priority rules.

Although an embodiment of the invention and its advantages are described in detail, a person skilled in the art could make various alterations, additions, and omissions without departing from the spirit and scope of the present invention as defined by the appended claims.

What is claimed is:

1. A computer-implemented method of generating an optimized pricing plan, comprising:
   accessing, by a computer, a hierarchy comprising a sequence of levels, each level comprising an objective function and a set of objective function constraints, wherein each objective function represents a primary objective or one or more secondary objectives;
   assigning, by the computer, a first fixed to a first item and a second fixed price to a second item according to one of the set of objective function constraints;
   preventing, by the computer, a rule violation resulting from the first and second fixed prices by de-linking the first and second items within a plurality of items;
   determining, by the computer, a mathematical programming model representing a pricing plan problem for an item group comprising the plurality of items, the mathematical programming model comprising a set of initial constraints;
   repeating, by the computer, for each level of the sequence of levels, until a last level is reached:
      adding the set of objective function constraints to the set of initial constraints;
      optimizing the mathematical programming model to yield an optimized boundary for the objective function;
      generating an optimized constraint from the optimized boundary; and
      adding the optimized constraint to the set of objective function constraints of the next level of the sequence of levels;
   optimizing, by the computer, an objective function of the last level of the sequence of levels subject to the set of objective function constraints to yield an optimized result, the set of objective function constraints comprising the optimized constraint generated from the optimized boundary of a previous level;

generating, by the computer, an optimized pricing plan in accordance with the optimized result, the optimized pricing plan associating an optimized price with each item of the item group;

determining by the computer, a number of price changes for ones of the plurality of items in accordance with the optimized pricing plan;

determining, by the computer, when the number of price changes for the ones of the plurality of items exceeds a predetermined number of price changes;

assigning a priority to the prices of the ones of the plurality of items that (1) have larger price changes, (2) are image items used to track competitors, or (3) have more stable prices; and changing the prices of the ones of plurality of items that have the highest priority.

2. The method of claim 1, wherein:
the mathematical programming model comprises a non-linear programming model; and
optimizing the objective function of the last level comprises optimizing the objective function using a non-linear programming technique.

3. The method of claim 1, further comprising:
splitting a category of items into a plurality of item groups, each item group comprising a set of items related by one or more item constraints; and
selecting one of the plurality of item groups for which to generate the optimized pricing plan.

4. The method of claim 1, wherein the optimized pricing plan lists the optimized price for each item of the item group for each time interval of the time period.

5. The method of claim 1, wherein the optimized pricing plan lists the optimized price for each item of the item group for each location.

6. The method of claim 1, wherein optimizing the mathematical programming model to yield an optimized boundary for the objective function comprises:
expressing the objective function using one or more slack variables; and
optimizing the one or more slack variables to determine the optimized boundary.

7. The method of claim 1, further comprising:
accessing a rounding rule for rounding the optimized price of an item for each item of the item group;
accessing a plurality of propagation rules, each propagation rule for determining the optimized price of a first item according to the optimized price of a second item, each propagation rule associated with an item of the item group; and
repeating the following for each item of the item group:
applying the rounding rule to the item of the item group; and
applying the propagation rule for determining the optimized price of the item according to a price of another item, if the item is associated with a propagation rule.

8. The method of claim 1, further comprising:
determining a price change for each item in accordance with the optimized pricing plan;
assessing a cost associated with each price change; and
adjusting the price change in response to the cost associated with the price change.

9. The method of claim 1, wherein:
assigning a priority to the price changes of the one or more items comprises prioritizing the price changes by associating a greater price change with a higher priority and associating a smaller price change with a lower priority; and
the price of the items that have the highest priorities are changed in a first time interval and the prices of the items that have lower priority are changed in a second time interval.

10. The method of claim 1, further comprising:
repeating the steps of accessing, determining, repeating, optimizing, and generating to generate a plurality of local optimized results;
determining a global optimized result from the local optimized results; and
generating the optimized pricing plan from the global optimized result.

11. The method of claim 1, further comprising:
accessing a plurality of demand models;
accessing demand data describing the item group;
evaluating the demand models in accordance with the demand data;
selecting a demand model of the evaluated demand models in response to the evaluation; and
calculating a price elasticity using the selected demand model.

12. A system of generating an optimized pricing plan, comprising:
a database stored therein a hierarchy comprising a sequence of levels, each level comprising an objective function, and a set of objective function constraints, wherein each objective function represents a primary objective or one or more secondary objectives; and
a computer system coupled with the database, the computer system configured to:
assign a first fixed price to a first item and a second fixed price to a second item, according to one of the set of objective function constraints;
prevent a rule violation resulting from the first and second fixed prices by de-linking the first and second items within a plurality of items;
determine a mathematical programming model representing a pricing plan problem for an item group comprising the plurality of items, the mathematical programming model comprising a set of initial constraints;
repeat for each level of the sequence of levels, until a last level is reached:
adding the set of objective function constraints to the set of initial constraints;
optimizing the mathematical programming model to yield an optimized boundary for the objective function;
generating an optimized constraint from the optimized boundary; and
adding the optimized constraint to the set of objective function constraints of the next level of the sequence of levels;
optimize an objective function of the last level of the sequence of levels subject to the set of objective function constraints to yield an optimized result, the set of objective function constraints comprising the optimized constraint generated from the optimized boundary of a previous level;
generate an optimized pricing plan in accordance with the optimized result, the optimized pricing plan associating an optimized price with each item of the item group;

determine a number of price changes for ones of the plurality of items in accordance with the optimized pricing plan;

determine when the number of price changes for the ones of the plurality of items exceeds a predetermined number of price changes;

assign a priority to the prices of the ones of the plurality of items that (1) have larger price changes, (2) are image items used to track competitors, or (3) have more stable prices; and change the prices of the ones of plurality of items that have the highest priority.

13. The system of claim 12, wherein:

the mathematical programming model comprises a non-linear programming model; and the computer system is further configured to optimize the objective function of the last level by optimizing the objective function using a non-linear programming technique.

14. The system of claim 12, wherein the computer system is further configured to:

split a category of items into a plurality of item groups, each item group comprising a set of items related by one or more item constraints; and select one of the plurality of item groups for which to generate the optimized pricing plan.

15. The system of claim 12, wherein the optimized pricing plan lists the optimized price for each item of the item group for each time interval of the time period.

16. The system of claim 12, wherein the optimized pricing plan listing lists the optimized price for each item of the item group for each location.

17. The system of claim 12, wherein the computer system is further configured to optimize the mathematical programming model to yield an optimized boundary for the objective function by:

expressing the objective function using one or more slack variables; and optimizing the one or more slack variables to determine the optimized boundary.

18. The system of claim 12, wherein the computer system is further configured to:

access a rounding rule for rounding the optimized price of an item for each item of the item group;

access a plurality of propagation rules, each propagation rule for determining the optimized price of a first item according to the optimized price of a second item, each propagation rule associated with an item of the item group; and repeat the following for each item of the item group:

applying the rounding rule to the item of the item group; and applying the propagation rule for determining the optimized price of the item according to a price of another item, if the item is associated with a propagation rule.

19. The system of claim 12, wherein the computer system is further configured to:

determine a price change for each item in accordance with the optimized pricing plan;

assess a cost associated with each price change; and adjust the price change in response to the cost associated with the price change.

20. The system of claim 12, wherein:

assign a priority to the price changes of the one or more items comprises prioritize the price changes by associating a greater price change with a higher priority and associating a smaller price change with a lower priority; and the price of the items that have the highest priorities are changed in a first time interval and the prices of the items that have lower priority are changed in a second time interval.

21. The system of claim 12, wherein the computer system is further configured to:

repeat the steps of accessing, determining, repeating, optimizing, and generating to generate a plurality of local optimized results;

determine a global optimized result from the local optimized results; and generate the optimized pricing plan from the global optimized result.

22. The system of claim 12, wherein the computer system is further configured to:

access a plurality of demand models;

access demand data describing the item group;

evaluate the demand models in accordance with the demand data;

select a demand model of the evaluated demand models in response to the evaluation; and calculate a price elasticity using the selected demand model.

23. A non-transitory computer-readable medium embodied with software for generating an optimized pricing plan, the software when executed using a computer is configured to:

access a hierarchy comprising a sequence of levels, each level comprising an objective function and a set of objective function constraints, wherein each objective function represents a primary objective or one or more secondary objectives;

assign a first fixed price to a first item and a second fixed price to a second item, according to one of the set of objective function constraints;

prevent a rule violation resulting from the first and second fixed prices by de-linking the first and second items within a plurality of items;

determine a mathematical programming model representing a pricing plan problem for an item group comprising the plurality of items, the mathematical programming model comprising a set of initial constraints;

repeat for each level of the sequence of levels, until a last level is reached:

adding the set of objective function constraints to the set of initial constraints;

optimizing the mathematical programming model to yield an optimized boundary for the objective function;

generating an optimized constraint from the optimized boundary; and adding optimized constraint generated from the optimized boundary to the set of objective function constraints of the next level of the sequence of levels;

optimize an objective function of the last level of the sequence of levels subject to the set of objective function constraints to yield an optimized result, the set of objective function constraints comprising the optimized constraint generated from the optimized boundary of a previous level;

generate an optimized pricing plan in accordance with the optimized result, the optimized pricing plan associating an optimized price with each item of the item group;

determine a number of price changes for ones of the plurality of items in accordance with the optimized pricing plan;
determine when the number of price changes for the ones of the plurality of items exceeds a predetermined number of price changes;
assign a priority to the prices of the ones of the plurality of items that (1) have larger price changes, (2) are image items used to track competitors, or (3) have more stable prices; and
change the prices of the ones of plurality of items that have the highest priority.

24. The computer-readable medium of claim 23, wherein:
the mathematical programming model comprises a non-linear programming model; and
the software is further configured to optimize the objective function of the last level by optimizing the objective function using a non-linear programming technique.

25. The computer-readable medium of claim 23, wherein the software is further configured to:
split a category of items into a plurality of item groups, each item group comprising a set of items related by one or more item constraints; and
select one of the plurality of item groups for which to generate the optimized pricing plan.

26. The computer-readable medium of claim 23, wherein the optimized pricing plan lists the optimized price for each item of the item group for each time interval of the time period.

27. The computer-readable medium of claim 23, wherein the optimized pricing plan lists the optimized price for each item of the item group for each location.

28. The computer-readable medium of claim 23, wherein the software is further configured to optimize the mathematical programming model to yield an optimized boundary for the objective function by:
expressing the objective function using one or more slack variables; and
optimizing the one or more slack variables to determine the optimized boundary.

29. The computer-readable medium of claim 23, wherein the software is further configured to:
access a rounding rule for rounding the optimized price of an item for each item of the item group;
access a plurality of propagation rules, each propagation rule for determining the optimized price of a first item according to the optimized price of a second item, each propagation rule associated with an item of the item group; and
repeat the following for each item of the item group:
applying the rounding rule to the item of the item group; and
applying the propagation rule for determining the optimized price of the item according to a price of another item, if the item is associated with a propagation rule.

30. The computer-readable medium of claim 23, wherein the software is further configured to:
determine a price change for each item in accordance with the optimized pricing plan;
assess a cost associated with each price change; and
adjust the price change in response to the cost associated with the price change.

31. The computer-readable medium of claim 23, wherein:
assign a priority to the price changes of the one or more items comprises prioritize the price changes by associating a greater price change with a higher priority and associating a smaller price change with a lower priority; and
the price of the items that have the highest priorities are changed in a first time interval and the prices of the items that have lower priority are changed in a second time interval.

32. The computer-readable medium of claim 23, wherein the software is further configured to:
repeat the steps of accessing, determining, repeating, optimizing, and generating to generate a plurality of local optimized results;
determine a global optimized result from the local optimized results; and
generate the optimized pricing plan from the global optimized result.

33. The computer-readable medium of claim 23, wherein the software is further configured to:
access a plurality of demand models;
access demand data describing the item group;
evaluate the demand models in accordance with the demand data;
select a demand model of the evaluated demand models in response to the evaluation; and
calculate a price elasticity using the selected demand model.

* * * * *

UNITED STATES PATENT AND TRADEMARK OFFICE
CERTIFICATE OF CORRECTION

PATENT NO. : 8,494,887 B2
APPLICATION NO. : 10/315282
DATED : July 23, 2013
INVENTOR(S) : Joachim Paul Walser et al.

Page 1 of 1

It is certified that error appears in the above-identified patent and that said Letters Patent is hereby corrected as shown below:

Please amend the specification appearing at Column 6, at line 30-36 to read as:

$$\text{subject to} \quad \max M$$

$$\underline{p_i} \leq p_i \leq \overline{p_i} \qquad \text{price limits}$$
$$p_i = l_{ij} \cdot p_j + l^a_{ij} \qquad \text{price link constraints}$$
$$p_i \leq b_{ij} \cdot p_j + b^a_{ij} \qquad \text{price band constraints}$$

Signed and Sealed this
Third Day of September, 2013

Teresa Stanek Rea
*Acting Director of the United States Patent and Trademark Office*